United States Patent [19]
McManus

[11] 3,986,122
[45] Oct. 12, 1976

[54] RELIABLE COMMUNICATIONS SYSTEM

[75] Inventor: Robert P. McManus, San Diego, Calif.

[73] Assignee: The United States of America as represented by the Secretary of the Navy, Washington, D.C.

[22] Filed: May 22, 1962

[21] Appl. No.: 197,563

[52] U.S. Cl. ................................. 325/42; 325/65
[51] Int. Cl.² .......................................... H04B 1/10
[58] Field of Search ............ 178/23.1; 325/41, 42, 325/44, 47, 65, 135, 323, 345, 474; 235/153 AH

[56] References Cited
UNITED STATES PATENTS

| | | | |
|---|---|---|---|
| 2,512,038 | 6/1950 | Potts | 178/23.1 |
| 2,731,600 | 1/1956 | Stachura | 332/21 |
| 2,794,970 | 6/1957 | Yostpile | 178/23.1 |
| 2,854,653 | 9/1958 | Lubkin | 178/23.1 |
| 2,879,501 | 3/1959 | Baran | 332/14 |
| 2,957,947 | 10/1960 | Bowers | 325/42 |
| 3,291,972 | 12/1966 | Helm | 325/41 |

*Primary Examiner*—Howard A. Birmiel
*Attorney, Agent, or Firm*—R. S. Sciascia; G. J. Rubens; T. M. Phillips

EXEMPLARY CLAIM

1. A communications transmitter system comprising; serial register means adapted to receive digital information for generating a digital word and having inputs and outputs; parallel register means operatively connected to the output of said serial register means for storing the output of said serial register; modulating means operatively connected to the output of said parallel register means for generating upper and a lower sidebands; each of said sidebands containing said digital word complementing means operatively connected to said modulating means for complementing one of said upper and lower sidebands; and radio frequency transmitter means operatively connected to the output of said complementing means and said modulating means for transmitting said upper sideband and lower sideband simultaneously.

10 Claims, 13 Drawing Figures

FIG. 1
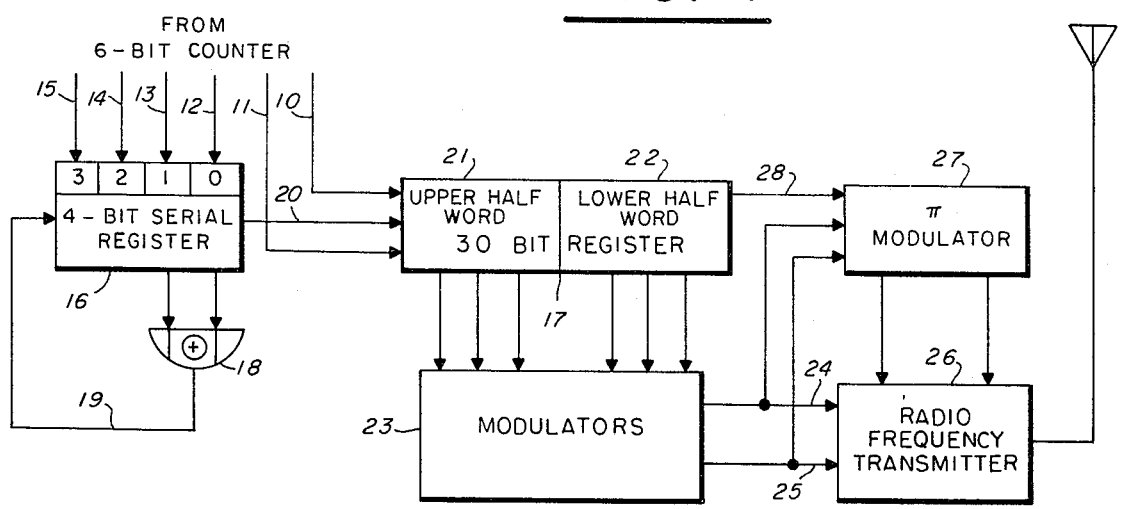
FIG. 3
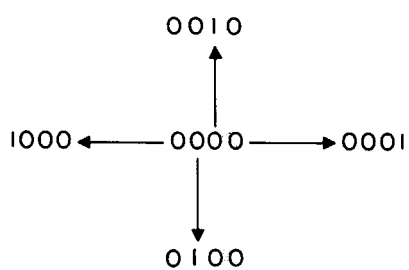
```
            0010
             ↑
1000 ← 0000 → 0001
             ↓
            0100
```
FIG. 4
```
     1 2 3 4
A    0 0 0 0   1
B  ⎧ 0 0 0 1
   ⎨ 0 0 1 0   4
   ⎪ 0 1 0 0
   ⎩ 1 0 0 0
C  ⎧ 0 0 1 1
   ⎪ 0 1 0 1
   ⎨ 1 0 0 1   6
   ⎪ 0 1 1 0
   ⎪ 1 0 1 0
   ⎩ 1 1 0 0
D  ⎧ 1 1 1 0
   ⎨ 1 1 0 1   4
   ⎪ 1 0 1 1
   ⎩ 0 1 1 1
E    1 1 1 1   1
```
FIG. 5
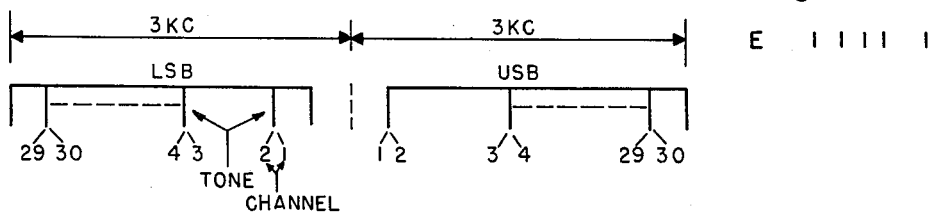
INVENTOR.
ROBERT P. McMANUS
BY
*ATTORNEYS*

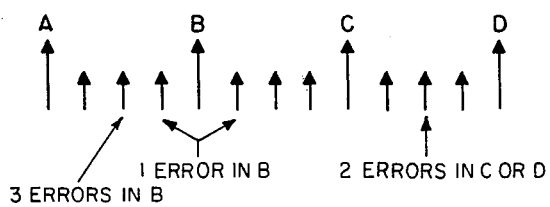
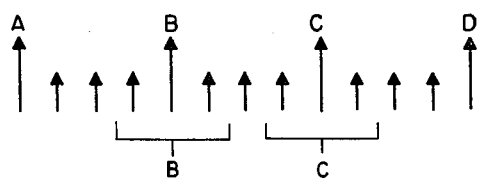
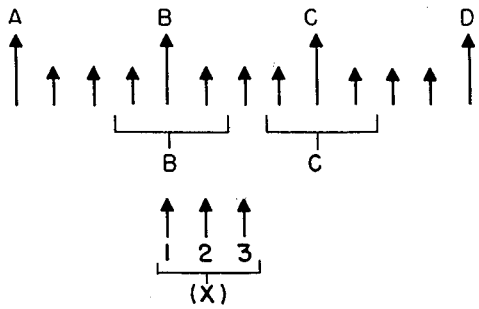
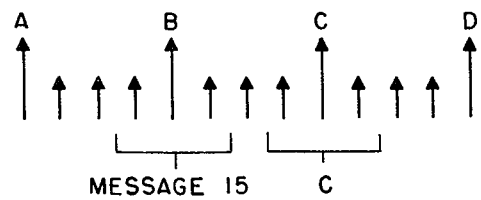

RELIABLE COMMUNICATIONS SYSTEM

The invention described herein may be manufactured and used by or for the Government of the United States of America for governmental purposes without the payment of any royalties thereon or therefor.

The present invention relates to a system for enhancing the reliability of a communications link and more particularly, to a system for providiing separation of control messages from target messages in a communication link and more specifically, to a system for providing a reliable communications link having separation of control messages from target messages and allowing correction of errors in a target message. The class of errors to be considered are those which are introduced external to the antennas of the link, i.e., the transmission path errors.

In general, in the two to six megacycle range there are two types of noise present, random and impulse noise. Random noise is the background phenomena that produces errors grouped over an integral power series of the probability of error. That is, if $p$ is the probability of a single bit error, then $p^2$ is the probability of two errors occurring simultaneously. On the other hand, impulse noise tends to produce errors in groups.

Another source which tends to produce errors in groups rather than in a random distribution is interference.

Another phenomena that produces errors is fading which is divided into two kinds according to its bandwidth. If the bandwidth of the fading is wide compared to the signal bandwidth, it is called flat fading. If the bandwidth is narrow compared to the signal, it is called selective fading. Fading produces errors in a different manner than the previously mentioned problems in the sense that it shuts the signal off at the receiver rather than overpowering it with a stronger signal. Fading produces errors in the system that are Rayleigh distributed.

In summation, the error distribution is by no means random and calculations based on random distribution are erroneous.

When discussing the results of transmission path errors, it is convenient to divide the information transferred into two classes. The first class is the user information or user message while the second class is the control information or those messages which provide system control so that it operates as an integrated net. As far as the user is concerned, control messages are overhead in the system in that the users primary concern is that the user messages are accurately promulgated throughout the net.

The effects or errors in target messages may be divided into sub-classes, i.e., those which produce marginal communication and those which are catastrophic in nature. The characteristic of marginal errors is that they occur frequently, mostly single bit errors; whereas the characteristic of catastrophic errors is that they occur less frequently within groups. Most of the marginal errors can be rejected by simple parity checking, thereby nullifying their effects. In the case of catastrophic errors, a considerable amount of misinformation is introduced into the system. It is very difficult to categorize the results of this misinformation in the system except that one could easily generate cases that are negligible and also cases that are disastrous.

In that the number of control messages required to control the net are few compared to the number of user messages, sufficient redundancy can be incorporated into the system to nullify the effects of marginal errors. Catastrophic errors on the other hand can cause rather serious system difficulties such as confusion of calling procedure.

The effect of transmission path errors or net operation is the total effect of errors in user messages and control messages. A fundamental concept of the system is that all ships simultaneously receive any ship's transmission. Since the distance between any of the ships may range from a few hundred feet to 300 miles, it is quite likely that the ships will have different error probabilities. This means that with the use of an error correcting and detecting code, all ships will not reject the same information. A more serious condition exists when the error threshold of the code is exceeded, thereby allowing some ships to replace correct information with incorrect information.

Returning to the first premise that all ships simultaneously receive all transmissions it then becomes necessary to take precautionary measures to guard against marginal communications. Confusion of control messages will likewise cause system anomalies such as stopping the net, loading the computer with noise or having two ships transmitting at the same time.

An object of the present invention is to provide a reliable communication link.

Another object of the invention is to provide a communication link which has wide removal between control messages and user messages.

A further object of the invention is to provide a reliable communications link wherein individual control messages and individual user messages have wide removal as between individual control messages and individual user messages.

An additional object of the invention is to provide a reliable communications link for accomplishing error detection.

A further object of the present invention is to provide a reliable communications like which will correct errors in communications messages.

An additional object of the present invention is to provide a communications link which lends itself to visual display.

Various other objects and advantages will appear from the following description of one embodiment of the invention, and the novel features will be particularly pointed out hereinafter in connection with the appended claims.

For purposes of illustrating the invention reference is made to the drawings wherein:

FIG. 1 is a block diagram of the communications link transmitter;

FIG. 3 is a diagram showing the concept of removal;

FIG. 4 is a list showing all possible sequences of four bit codes;

FIG. 5 is a figure illustrating dual frequency diversity;

FIG. 6 is a figure illustrating the use of the frame difference word with an error in one sideband;

FIG. 7 illustrates the concept of error correction by selection;

FIG. 8 is a geometrical representation of the concept of removal;

FIG. 9 is a geometrical representation of the correction of one error;

FIG. 10 is a geometrical representation of the control message and a user message;

FIG. 11 is a geometrical representation of another Hamming encoded user message and a control message;

FIG. 12 is a graphic representation of the use of the frame difference word in complementary diversity coding; and FIG. 13 is a table showing octal codes and corresponding 30-bit codes used in the present invention.

Figure 2:
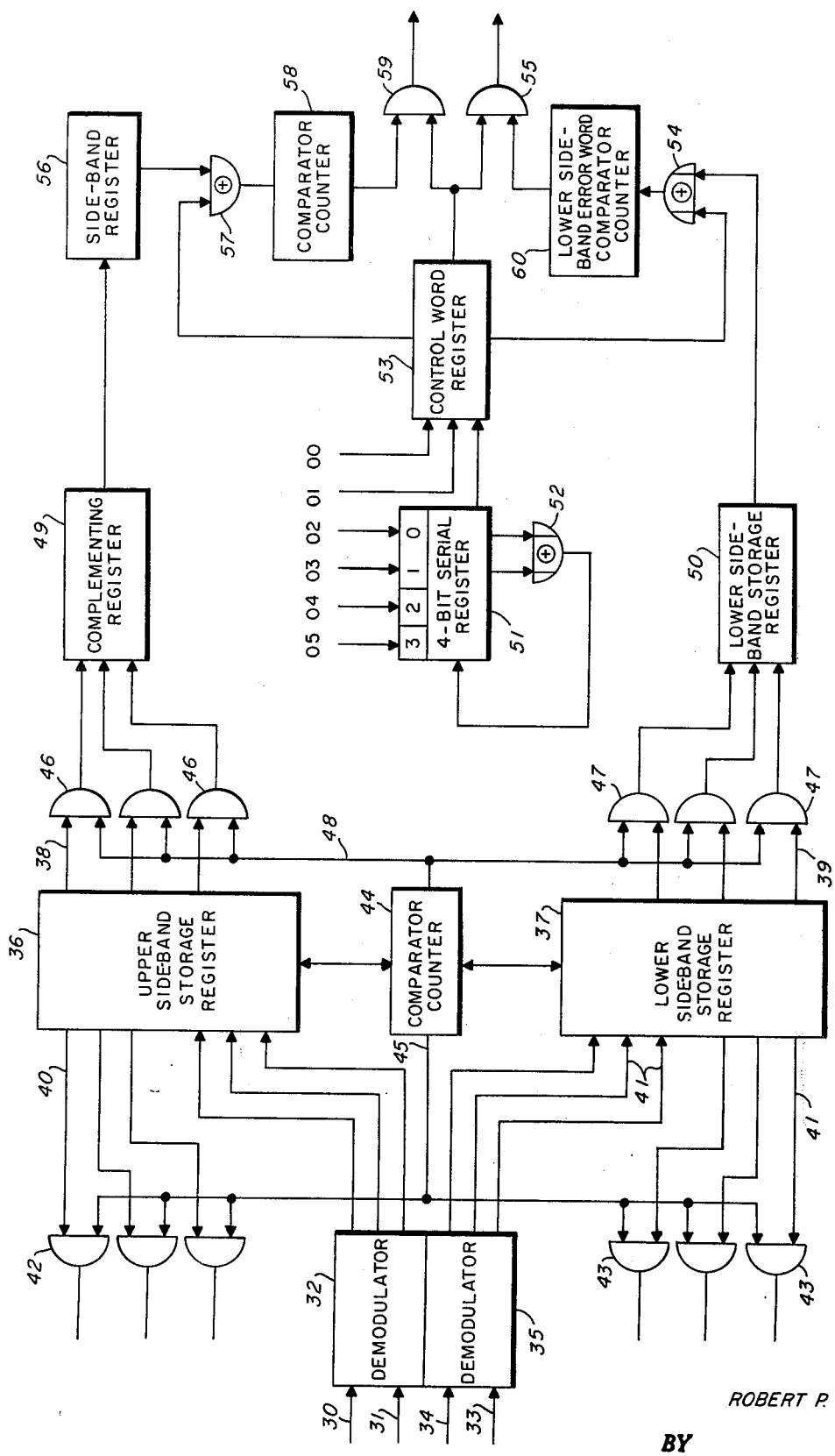
FIG. 2 is a block diagram of the communications link receiving system.

FIG. 1 illustrates the transmitting system utilized to provide the removal desired in the control word messages. Lines 10 through 15 represent the output from a six-bit counter. Lines 12 through 15 are coupled to the inputs of a four-bit serial register 16 while lines 10 and 11 are coupled to the inputs on a 30-bit register 17. The output of two of the stages in the four-bit serial register 16 are coupled to the inputs of exclusive OR gate 18 where a sum modulo two operation is performed on the outputs of the first two stages of the four bit serial register 16. The output of the exclusive OR gate 18 is coupled back through line 19 to an input on the four bit serial register 16 thereby giving the four bit serial register 16 the capability of producing a serial 15-bit word on output line 20. Thus, the serial register 16 is a polynominal word generator capable of generating a 15-bit word which is coupled through line 20 to an input on the 30-bit parallel register 17. The 15-bit word is stored twice in the 30-bit register, once in the upper half word portion 21 and once in the lower word portion 22. Lines 10 and 11 which are also coupled to the 30-bit parallel register 17 provide a complementing function for the lower half work portion of the register and the upper half word portion of the register, respectively. When a binary 1 appears on line 10 the lower half word portion of the register is complemented and when a binary 1 appears on line 11 the upper half word in the register is complemented.

The output of the 30-bit parallel register is coupled to modulators 23 which in the present case comprise Collins Kineplex tone generators utilizing a phase shift modulation technique. Kineplex equipment is manufactured by the Collins Radio Company and an explanation of the operation of the system is set forth in the following listed publications: Kineplex Collines High Speed Data Transmission System, 3M-4/960-WP Part No. CR-WD-1006 and *Published Technical Articles on Binary Data Transmission Techniques;* "Collins Kineplex System" prepared by Richard Miller, Collins Radio Company, Burbank, Cal.; delivered at the Hawaii IRE Symposium, Aug. 29, 1957. The output of the modulators 23, corresponding to the lower sideband, is coupled through lines 24 and 25 directly to the radio frequency transmitter 26. Also coupled to lines 24 and 25, is a $\pi$ modulator 27 which in the present case merely comprises a reversing switch. The output of the $\pi$ modulator 27 represents the upper sideband which is also coupled directly to the frequency transmitter 26. In order to render the $\pi$ modulator 27 operative an output is coupled from the parallel register 17 on line 28 representative of a control word ready pulse. When a pulse appears on line 28 the $\pi$ modulator is activated and complements the lower sideband.

In FIG. 2, which represents the receiver portion of the communications system, the upper sideband is received from a receiver, not shown, on lines 30 and 31 and coupled into a Collins Kineplex demodulator 32 while the lower sideband is received on lines 33 and 34 and coupled into a corresponding Collins Kineplex demodulator 35. The output of the demodulator corresponding to the upper sideband is loaded into an upper sideband storage register 36 while the output of the lower sideband demodulator 35 is loaded into the lower sideband storage register 37. Actually, 30-bits of information are represented, however, only three lines are shown for the purposes of clarity and simplicity of illustration. The output of the upper sideband register on lines 38 represents a control word present while an output of the lower sideband register on lines 39 represents a control word present on the lower sideband.

The target words would be gated out on lines 40 for the upper sideband and on lines 41 for the lower sideband. The upper sideband target words are coupled on lines 40 to one side of And gates 42 while the lower sideband target words are coupled on lines 41 to And gates 43. The enabling gate for the And gates 42 and 43 is coupled from a comparator counter 44 wherein a modulo two addition is performed on a bit by bit basis between the contents of upper sideband storage register 36 and lower sideband storage register 37. Upon a particular count being reached for the target words, $0 \leq N \leq 1$, an enabling pulse is coupled from the comparator counter 44 on line 45 to And gates 42 and 43.

Control word function would take place in the same way in that the control word upper sideband control word is coupled to And gates 46 and the lower sideband control word coupled to And gates 47. The enabling pulse for And gates 46 and 47 is coupled from comparator counter 44 on line 48 when $27 \leq N \leq 30$. In the case of the upper sideband control word the word is gated into a complementing register 49 where the control word is complemented. In the case of the lower sideband control word, the word is gated from And gates 47 and coupled directly to a lower sideband storage register 50. In the present case, the upper sideband is shown as being the complemented one, however, it is just as practicable and possible to complement the lower sideband, if desired.

The contents of the lower sideband register are compared against a control word which is produced by a control word generator comprising a four-bit serial register 51 and exclusive OR gate 52. The serial register functions exactly the same that in the transmitter of FIG. 1 in that digital information is received on lines 00 and 05 and the polynomial word generator generates a 15-bit word which is used in the comparing operation.

The control word is stored in a register 53 and then compared against the lower sideband word in an exclusive OR gate 54 wherein a sum modulo two operation takes place. The output of the sum modulo two operation in exclusive OR gate 54 is introduced into a lower sideband error word comparator counter 60 which counts the number of errors. If there are 6 errors or less, a pulse is produced which is coupled to an And gate 55. The other input to And gate 55 is the output of the control word register 53, thus, when the control word and the lower sideband error word compare within 6 errors or less, the content of the control word register is gated out.

Similarly, the upper sideband control word is stored in an upper sideband control word storage register 56 and compared against the control word from the control word register 53 in exclusive OR gate 57 and the errors counted in a comparator counter 58. When the output of the comparator counter indicates six errors or less, an output pulse is produced which enables And gate 59 and the control word is gated through for further use.

In order to better understand the operation of the system a short discussion of some problems and the method of combating them follows.

In view of the preceding discussion of the error problem and the equipment, it is now possible to define some system properties necessary to combat the system degradation brought about by these errors. First, the concept of removal is introduced and defined.

The removal between any two binary sequences of the same length is the number of binary digits that must be changed in one sequence in order to make it look like the other sequence. For example, the sequence consisting of four zeros (0000) is removed by four digits from the sequence of four ones (1111).

FIG. 3 illustrates four sequences having a removal of one from the center sequence of four zeros.

Another way of stating the above is to ask the question — how many unique sequences are generated from 0000 by allowing one error? The answer is computed by calculating the number of combinations of four things taken one at a time which in this case equals four.

$$C_r^n = \frac{n!}{r!\,(n-r)!} \quad (1)$$

$$C_1^4 = 4$$

FIG. 4 is a list of the possible four bit sequences or codes collected in five groups according to the number of one's that are available. For example, group A contains all the codes that have zero ones; group B contains all of the codes that have one one, etc.

In FIG. 4 it can be seen that there are $2^4$ or 16 unique sequences or codes available. The terms legal codes and illegal codes will now be introduced. If all 16 codes are used to encode 16 mutually exclusive pieces of information, then all of the 16 codes are legal codes. This means then, that any time there is an error in the transmission path, there is a change from one legal code to another with the introduction of incorrect information into the system.

The next concept introduced is that of error detection. To accomplish error detection the original 16 codes are subdivided into two classes; those which are defined as legal and those which are defined as illegal. Each legal code represents a different piece of information. To the class of illegal codes is assigned a class property that is easily discernable and that identifies any member of the class. For example, it is possible to define the class property for the illegal codes as being all of those codes with an odd number of ones. This is known as simple parity and is accomplished at the transmitter end of the system by setting aside one bit in each code that is adjusted to make the number of ones odd or even, as desired. In the above case, the number of ones transmitted is always even. At the receiving end of the system under this condition, each code that has an odd number of ones is rejected. Returning now to FIG. 4, it is seen that the codes with an odd number of ones are in groups B and D, and the total number of these is eight, so that the price paid for detecting an odd number of errors is the reduction of available information or legal codes to one half. In FIG. 4 then, all codes in groups A, C, and E are legal and those in groups B and D are illegal.

The final concept introduced at this point is that of correcting errors. Suppose that it is desired to transmit the message of four zeros (0000) and at the receiver it is desired to receive this message with the ability to correct one error. FIG. 3 shows the four possible codes that could be generated from the message of four zeros by allowing one error. In FIG. 4 these are the group B codes. At the receiving end, in order to correct one error in the message of 0000 the receiver not only would have to recognize 0000 but also all of the codes in group B of FIG. 4 as being the message of 0000. If the message of 0000 is defined as message number 1, there is only one other code in FIG. 4 with sufficient removal to correct an error. This is the complement of message number 1 or the code of four ones (1111) which is defined as message number 2. Thus, there are five legal codes in groups A and B but they only define one piece of information.

There are five legal codes in groups E and D, but again these only represent message number 2. The codes in group C are illegal because it is impossible to distinguish whether they are generated from message number 1 with two errors or from message number 2 with two errors. Therefore, they cannot be used for correction, but they can be detected and rejected. Thus, in the example the price paid if it is desired to correct one error and detect two is to limit the information to two legal codes out of the possible 16.

With the above set forth it is now possible to proceed with the discussion of system properties to combat errors. If a bit error probability of 0.01 exists, marginal errors are occurring much too often just to detect and reject them. Therefore, there should be some means of correcting errors in the user messages. Further, the measure distribution of N errors per frame shows that errors occur in bursts, which means that some sort of coding error threshold protection is required.

If a user message is corrupted so that it is rejected, there is a loss of time of 44 milliseconds. If control messages are used there are much larger time losses in that an entire transmission may be garbled or the net stopped. Control messages, therefore, require more protection than user messages. Further, if some user messages can be decoded as control codes, the system is destined for disaster every time one of these user messages is transmitted. Therefore, all control messages should be removed be at least a factor K, to be defined later, from all user messages. A further requirement for control messages is that they should have a large removal from one another, so that error correction can be applied.

Some new system concepts that are used in achieving a more reliable communications link are now introduced. The communication link terminal receives 30 parallel bits of binary information from the unit computer. It then takes these 30 bits two at a time and encodes them as phase shift modulation on 15 audio tones. The single sideband radio frequency equipment has the capability of simultaneously transmitting or receiving two independent 3 kc audio channels. The audio channel immediately below the suppressed channel carrier in the frequency plane is called the lower sideband (LSB) while the audio channel immediately above the suppressed carrier is called the upper sideband (USB). The audio output from the terminal is simultaneously fed to both input channels of the R. F.

equipment by paralleling the two inputs. FIG. 5 is a graph of radio frequency spectrum at the antenna.

Notice that instead of 30 bits or 15 tones being transmitted there are 60 bits or 30 tones being transmitted. This is due to the fact that the information in the LSB is identical with the information in the USB, or in other words, the information has frequency redundancy. This type of transmission and reception is called dual frequency diversity. In the present equipment, the diversity bits or channels are combined in an analog fashion by resistance addition such that the stronger signal is the one that is selected. The method of diversity combination will be the point of departure from the present systems and the point at which the new system concepts are introduced.

First, let the process of transmitting identical information of both sidebands be defined as normal diversity coding. The first column in FIG. 6 is the bit or channel number, assuming that the first bit is number 1 instead of zero as this makes the channel numbers and the bit numbers agree. The second and third column are the lower sideband word and the upper sideband word, respectively. The $k$'s under the column FDW are the result of modulo two addition of the channel represented by the subscript in the LSB and USB. Then $k_1$ will have the value of zero if the 1-th channel in the LSB and USB are the same, and it will have the value of one if they are different. There are 30 $K$'s, one for each channel, and those 30 $K$'s constitute the frame difference word (FDW).

Define N as the arithmetical sum of the number of one's in the FDW, as:

$$N = \sum_{1}^{30} k_i \qquad (2)$$

FIG. 7 illustrates error correction by selection wherein an error is detected on the FDW and indicated as an error present in channel 2. Parity is then counted on both sidebands independently and in that parity checks on the LSB of FIG. 7 the decision is to select the LSB.

Now suppose there is a further constraint placed on the words that the system accepts by limiting the value of N such that $0 \leq N \leq b$ and for an N greater than $b$ the word is rejected. By adjusting an error threshold constant $b$ it is now possible to select the error threshold for which a system is to operate. The transmission path quality factor N now provides an extremely powerful error detection tool which can be used in conjunction with error correcting techniques to ensure that only a negligible amount of erroneous information ever enters the system.

The user messages will employ Hamming error correction and detection coding. The Hamming process requires six bits for parity checking and since there are 30 bits available there are 24 bits left for information. Another way of stating this is to say that there are $2^{24}$ user messages available if Hamming coding is employed. Additionally, Hamming coding exhibits a minimum removal of four between any of its legal codes. In other words, four errors in a legal code are necessary before it becomes another legal code. This particular Hamming technique may be decoded at the receiver to correct zero and detect three errors or to correct one and detect two errors. If the Hamming code is used to corrent one error, then an error threshold exists for three errors and incorrect information will get through. The major distribution from propagation tests show that this error threshold will be exceeded considerably more often then a random distribution would indicate. Since this error threshold is exceeded so often, the coding error threshold protection provided by the transmission path quality factor N is required.

In order to discuss the removal of control messages from user messages, it is convenient to introduce a geometrical notion of removal. Let a vertical arrow represent any 30-bit sequence so that the process can then be graphically illustrated.

In FIG. 8 the four longer arrows represent legal codes, while the short arrows represent illegal codes. The longer arrows labelled A, B, C, and D, are user messages Hamming coded and are removed from each other by four. The nearest short arrow, illegal code, to any long arrow, legal Hamming code, represents the legal code corrupted by one error or the next nearest legal code by three errors. The middle short arrow, between two long arrows represents an illegal code that could have been generated by two errors in either of the nearest legal codes.

FIG. 9 is a geometrical representation of the correction of one error. A, B, C, and D are 30 bit Hamming bit user messages. It was shown previously that if it is desired to correct one error in B at the receiver, not only B but also the codes that are removed from B by one must be recognized. Since B is a 30 bit code, there are exactly 30 codes removed from B by one. The short arrows next to B represent two of these 30 codes, and the bracket under B can be thought of as a funnel that not only accepts B but also accepts the 30 codes that B can generate by having one error.

In FIG. 10, A, B, C, and D are user messages, and the numbers 1, 2, and 3 represent three possible positions that an arbitrarily selected 30 bit control code (X) could take. If position 1 were selected, then control code X would have no removal from the user message B. If position 2 were selected for the control code X then it would have a removal of one, but would be accepted as B in a correct one scheme. If position 3 were chosen, then control code X would be removed by two from B and C. In a correct one scheme for B and C, control code X has no correction capability. In fact, control code X has to be recognized uniquely; because if there is one error, control code X will be recognized as some user message with B and C being 2 out of a possible 30 codes.

In FIG. 11, A, C, and D are Hamming coded user messages. Message 15 is a set of messages set aside for control purposes. There are $2^{20}$ possible legal Hamming codes in message 15. If the control code X is a legal Hamming, it then has a minimum removal of four from any other legal Hamming, and has a capability of correcting one error. Summarizing from the preceding discussiong it follows that if control code X is not a legal Hamming code, the best removal one could expect from user message would be two. If control code X is a legal Hamming Code there would be a removal of four from any user message.

A system that will remove any 30 bit control code from and 30 bit user message by removal of 30 will now be considered. The communication link terminal described in the present invention uses a phase shift modulation technquse, Collins Kineplex, wherein two independent bits of information are carried by a single audio tone by phase referencing. If the phase of the tone has 180° added to or substracted from it at the beginning of the frame period, the two bits of information are reversed or complemented. Since 180° equals pi radians, the name pi modulator has been assigned to the device that adds pi radians simultaneously to the 15 audio tones that form the USB of the R. F. spectrum when the proper command is given. The pi modulator is shown in FIG. 1 as block 27 and the control word ready line wherein the proper command is given is line 28. As stated previously, the pi modulator is nothing more than a reversing switch. When the pi modulator is actuated at the beginning of a frame, the USB is transmitted as the complement of the LSB of that frame only since it is the phase difference between two consecutive frames that carry the intelligence. This phenomenon of transmitting one sideband as the complement of the other is defined as complementary diversity coding for the purposes of this discussion.

FIG. 12 shows the channel number LSB word, USB word, and FDW with complementary diversity coding. The $k$'s of the FDW are the result of module two addition of the complementary channels in each sideband. The FDW for the noiseless case consists of 30 ones.

$$N = \sum_{1}^{30} k_i = 30 \qquad (5)$$

Therefore, the transmission path quality factor N is equal to 30. Now if the value of the transmission path quality factor for normal diversity coding and complementary diversity coding are compared, it is seen from the formula that N equals zero for normal diversity coding and that N equals 30 for complementary diversity coding. If the number of ones in the FDW are counted with a five bit counter, which counts to 32; whenever the counter reads zero normal diversity coding exists and whenever it reads 30, complementary diversity coding exists. Further, if all the user messages are transmitted by normal diversity coding and all the control messages are transmitted by complementary diversity coding, separation of the control messages from the user messages by a removal of 30 has been obtained.

As shown previously, the best removal heretofore obtainable between user codes and control codes without using complementary diversity coding was a removal of four, and this was obtained by using message 15, Hamming coded, for the control codes. However, with a pi modulator, it is possible to achieve removal of 30 thereby allowing a much wider latitude in the selection of the specific 30 bit control codes. Further, the $2^{20}$ Hamming codes contained in message 15 could be returned to the system for additional use or user information.

It is possible to enumerate control codes which have a minimum removal from one another of 14. That is, it requires 14 errors in one control code before it will become another legal control code. With a removal 14, six errors may be corrected and seven errors detected or zero errors corrected and 13 errors detected. This is quite an improvement over message 15 which if it were Hamming encoded could correct only one error. The control codes can all be generated by a six bit counter in conjunction with a four bit serial shift register using modulo two additive feedback and the ability to complement either half word of a 30 bit storage register. This is shown in FIG. 1 wherein two of the bits from the six bit counter go to the complementary function of the 30 bit storage bit register 17 and the other four bits go to a four bit serial register 16 as a parallel input. The four bit serial register 16 with sum modulo two feedback obtained in the exclusive OR gate 18 generates a 15 bit code. This 15 bit code is stored twice in the 30 bit register 17; once in the lower half word 22 and once in the upper half word 21.

The wire marked bit 10 is the complementary function for the lower half word. If it is set to a one, the lower half word is complemented. Similarly, the wire marked 11 complements the UHW if it is set to a one. Referring now to an octal code of 00 it is seen that bit position 0 and bit position 1 have the value of zero, therefore, the code stored in the 30 bit register remains AA where A represents an uncomplemented 15 bit word. The next code in the octal list of FIG. 13 is 01 which in binary is 000 001. Here it is seen that the four bit serial register 16 generates the same 15 bit code A, but since bit position zero on line 10 is set to a 1, the code in the 30 bit register is A A′, where A′ is the complement of A.

FIG. 13 shows that for the first four 30 bit codes of a 64 code table the four bit serial register generates the same 15 bit code of all zeros for A. The four 30 bit codes are constructed by complementing. Note that for the octal code of 03, there exists the 30 bit code of 30 ones.

In the preceding example, the two octal numbers were generated by a six bit counter, but in actual operation these numbers would represent ships' call signs and could be put into the system by a key set.

In order to decode the received control code it is first necessary that it be recognized that the control code has been transmitted. It is well to remember that user messages are transmitted by normal diversity coding and that the control messages are transmitted by complementary diversity coding. The method of separating the control messages from the user messages by the value of N (transmission path quality factor) is accomplished in the five bit counter contained within comparator counter 44 in FIG. 2. If N is equal to zero or one the decision is for a user message present and if N is equal to 27 or greater there is a decision for control message present.

The decoding process is accomplished by generating the particular 30 bit control using a polynomial word generator comprising the four bit serial register 51 and exclusive OR gate 52.

In FIG. 2 the control word is generated in the four bit serial register using the sum modulo two additive feedback from the exclusive OR gate 52 stored in the 30 bit register 53. The USB word comes from the input terminal to the complementor 49 which complements the USB word because the control word messages are transmitted by complementary coding. In this case, the USB was transmitted as the complement of the LSB by the pi modulator 27 in FIG. 1. The complemented upper sideband word is stored in the upper sideband register 56 and compared against the control word in register 53 by modulo two addition between the contents of the upper sideband register and the control register. If there are six ones or less in the upper sideband error word contained in the register 58, then the decision is that the control word was received on the USB.

The register 50 contains the LSB word and the determination of the control word with respect to the lower sideband is similar to that associated with the upper sideband except there is no complementing of the lower sideband word. Again, if the word stored in the lower sideband word register has six ones or less, then control code has been assumed received on the LSB.

Decoding the sidebands independently with the ability to correct six errors in every control code leads to another important property of this system, i.e., the test message characteristics of the control codes. A test message is defined as any message transmitted from a ship, such that all of the receiving ships have a prior knowledge of its characteristics and its time of transmission. For example, if the message of all zeros was transmitted for an hour from 1200 to 1300 every day, this would be a test message with time slot synchronization related to a time source independent of the transmission path.

Since the control codes are transmitted in complementary diversity coding and the user messages are transmitted in normal diversity coding, the transmission path quality factor N is equal to 30 (the noiseless case) for control codes thereby identifying the time or the frame during which they are being received. Further, the sideband error words, USBEW and LSBEW, indicate the particular channels or bit positions that have errors independently up to and including six errors for each sideband. This means then that any time a station receives a control message, this control message is also a test message that will indicate as many as six bad channels in either sideband thereby making a total of 12 in both.

The test message characteristics of the control codes provide an extremely useful tool to combat interference and jamming by allowing the construction of the predicted sideband composite word (PSCW). The PSCW is constructed from the upper sideband error word and the lower sideband error word by selecting the good channels from either sideband to make up the 30 bit words sent to the computer for Hamming decoding. Up to 12 errors can be corrected in a user message by this technique based on the assumption that the interference frequency function remains constant with time for at least a 44 millisecond period.

The sideband quality factors are similar to the transmission path quality factor in the sense that they are computed in precisely the same manner with the exception that the USB quality factor $N_u$ is the arithmetical sum of the number of ones in the USBEW $$N_u = \sum_{1}^{30} k_i \text{ (USB only)} \quad (6)$$

and the LSB quality factor $N_L$ is the arithmetical sum of the number of ones in the LSBEW $$N_L = \sum_{1}^{30} k_i \text{ (LSB only)} \quad (7)$$

It is possible to consider some displays, since they are made possible by the new parameters introduced above. Consider a cathode ray tube display similar to a radar PPI but displaying ships call signs instead of blips. This type of display give a geographic representation of the ships in the net and produces a much clearer picture of the net communications to the human monitor. Further, consider a set of symbols that are illuminated around a ship's call sign during the time interval that that particular ship is transmitting. A square symbol could encompass the call of the control ship and a circle symbol could indicate the picket ship. The call sign of a ship that did not answer could blink on and off. A triangular symbol around a ship's call sign could indicate that the reception from that particular ship was marginal. There are many advantages to this type of display, a major one of which is that it provides a perceptual output to the human monitor while communications are becoming marginal, which allows for corrective action before a catastrophic failure occurs. The transmission path quality factor N again provides the information for the marginal communication indicator. The marginal communication indication is produced by associating the history of the transmission path quality factor N for each ship as it is being received. A fixed threshold can be set for N or a sliding scale such as that for track quality may be used to trigger the marginal communications symbol.

Having the geography of the communications picture and the marginal communication symbol available, the human monitor can determine such things as sector interference, a station too far away for reception, or equipment malfunction at one of the stations. Further, if provisions are made for sampling the initiating stations transmissions, then the marginal communication indicator gives the human monitor an on line indication of the performance of the on station equipment.

A more detailed maintenance indication or display can be had by recording the history of the sideband quality factors $N_u$ and $N_1$ and making provisions for the print out or display of USBEW and LSBEW if arbitrary threshold are exceeded. This would give diagonstic information about the initiating stations equipment as well as trouble shooting information to the human monitor to help solve net communications problems.

Obviously many modifications and variations of the present invention are possible in the light of the above teachings. It is therefore to be understood that within the scope of the appended claims the invention may be practiced otherwise than as specifically described.

What is claimed is:

1. A communications transmitter system comprising; serial register means adapted to receive digital information for generating a digital word and having inputs and outputs; parallel register means operatively connected to the output of said serial register means for storing the output of said serial register; modulating means operatively connected to the output of said parallel register means for generating upper and a lower sidebands; each of said sidebands containing said digital word complementing means operatively connected to said modulating means for complementing one of said upper and lower sidebands; and radio frequency transmitter means operatively connected to the output of said complementing means and said modulating means for transmitting said upper sideband and lower sideband simultaneously.

2. A transmitting system as set forth in claim 1 wherein said serial register means is a four bit serial register and further including; exclusive OR means having inputs and an output, said inputs on said exclusive OR means being operatively connected to the outputs of two stages of said four bit serial register, the output of said exclusive OR means being operatively connected to an input on said four bit serial register, said four bit serial register thereby being adapted to generate a serial 15 bit word.

3. A communications transmitting system as set forth in claim 1 wherein said parallel register means operatively connected to the output of said serial register means comprises a 30 bit parallel bit register, said 30 bit parallel register being adapted to stored the output of said serial register means in an upper half word portion and a lower half portion.

4. A communications transmitting system as set forth in claim 3 and further including; input means on said 30 bit parallel register means operatively connected to the output of a digital storage means, one of said input means being operatively connected to said upper half word portion and one of said input means being operatively connected to said lower half word portion, said parallel register so constructed and arranged that a digital 1 on either of said input lines will function to complement a respective one of said upper half word portions and lower half word portions.

5. A transmitting system comprising; polynomial word generating means for generating a digital word; storage means operatively connected to the output of said polynomial word generator for storing said digital word; modulating means operatively connected to the output of said storage means for producing an upper and a lower sideband; each of said sidebands containing said digital word complementing means operatively connected to the output of said modulating means for complementing one of said upper sidebands and said lower sidebands; and radio frequency transmitter means operatively coupled to the output of said complementing means and said modulating means for transmitting said upper sideband and said lower sideband simultaneously.

6. A communications transmitting system as set forth in claim 5 wherein said storage means comprises an upper half word storage portion and a lower half word portion and wherein said output of said polynomial word generator is stored in said upper half word portion and also stored in said lower half word portion; and wherein said complementing means are operatively connected to said upper half word portion and lower half word portion for complementing said upper half word portions and lower half word portions.

7. A communications receiving system comprising; receiving means for receiving and separating an upper sideband and lower sideband and having outputs corresponding to an upper sideband and a lower sideband; upper sideband storage means operatively connected to said receiving means for storing intelligence corresponding to said upper sideband; lower sideband storage means operatively connected to the output of said receiving means for storing intelligence corresponding to said lower sideband; said upper sideband storage means and lower sideband means having outputs therefrom; upper sideband control word storage means operatively connected to the output of said upper sideband storage means; lower sideband control word storage means operatively connected to the output of said lower sideband control storage means; complementing means operatively connected to one of said upper sideband storage means said lower sideband storage means for complementing the output one of said upper sideband storage means and said lower sideband storage means; polynomial word generating means having inputs and outputs; word storage means operatively connected to the output of said polynomial word generator means for storing the output of said polynomial word generator means; comparator means operatively connected to the output of said upper sideband control word storage means and said polynomial word storage means for comparing outputs of said upper sideband control word storage means and said polynomial word storage means; other comparator means operatively connected to the output of said lower sideband control word storage means and said polynomial word storage means and having an output therefrom; upper sideband error word counting means operatively connected to the output of said comparator means; lower sideband error word counting means operatively connected to the output of said other comparator means and having an output therefrom; coincidence means operatively connected to said upper sideband error word counting means said lower sideband error word counting means and said control word storage means and having outputs therefrom when outputs from said control word generator means and one of said upper sideband error word counting means and said lower sideband error word counting means are coincident therein.

8. A communications receiving system as set forth in claim 7 and further including additional comparator means having inputs and outputs therefrom operatively connected to said upper sideband storage means and said lower sideband storage means for comparing the contents of said upper sideband storage means and said lower sideband storage means and determining whether one of a control word and a user word is present in said upper sideband and said lower sideband; coincidence means operatively connected to the output of said upper sideband storage means and said lower sideband storage means corresponding to control word information and connected to said additional comparator means for gating out the outputs of said upper sideband storage means and said lower sideband storage means when an output pulse from said additional comparator means to said coincidence means corresponds to a control word.

9. A communications receiving system as set forth in claim 8 and further including; other coincidence means operatively connected to other outputs on said upper sideband storage means and said lower sideband storage means corresponding to user word gates and connected to an output from said additional comparator means for producing output pulses corresponding to user words when pulses from said upper sideband storage means and lower sideband storage means and said additional comparator means are coincident therein.

10. A communications receiving system as set forth in claim 7 wherein said polynomial word generating means comprises a four bit serial register having outputs and inputs; exclusive OR means having inputs and an output and having inputs connected to outputs on said four bit serial register means for performing a sum modulo two operation on said outputs of said four bit serial register means; the output from said OR means operatively connected to the input of said four bit serial register means so that said four bit serial register produces a 15 bit serial word.

* * * * *